United States Patent
Nakamura et al.

(10) Patent No.: US 8,552,319 B2
(45) Date of Patent: Oct. 8, 2013

(54) TURNING DIRECTION INDICATOR DEVICE

(75) Inventors: Takeo Nakamura, Fukui (JP);
Masahiko Fujita, Fukui (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 12/964,019

(22) Filed: Dec. 9, 2010

(65) Prior Publication Data

US 2011/0147176 A1 Jun. 23, 2011

(30) Foreign Application Priority Data

Dec. 17, 2009 (JP) ................................. 2009-286125

(51) Int. Cl.
*H01H 3/16* (2006.01)

(52) U.S. Cl.
USPC .................... 200/61.27; 200/61.3; 200/61.31; 200/61.28; 200/61.57

(58) Field of Classification Search
USPC ............................................ 200/61.3–61.38
See application file for complete search history.

(56) References Cited

U.S. PATENT DOCUMENTS

| | | | | |
|---|---|---|---|---|
| 4,855,542 A * | 8/1989 | Furuhashi et al. | .......... | 200/61.27 |
| 5,030,802 A * | 7/1991 | Noro | .......... | 200/61.27 |
| 5,923,010 A * | 7/1999 | Khoury et al. | .......... | 200/61.27 |
| 6,472,623 B1 * | 10/2002 | Hayashi | .......... | 200/61.27 |
| 6,677,543 B2 * | 1/2004 | Takahashi et al. | .......... | 200/61.3 |
| 7,453,048 B2 * | 11/2008 | Cordier et al. | .......... | 200/61.3 |

FOREIGN PATENT DOCUMENTS

JP 08-167345 6/1996

* cited by examiner

*Primary Examiner* — Renee Luebke
*Assistant Examiner* — Ahmed Saeed
(74) *Attorney, Agent, or Firm* — McDermott Will & Emery LLP

(57) ABSTRACT

A turning direction indicator device includes an actuator that rotates by an operation of the operating lever, a cam body that shifts in a rearward direction approaching a cancel cam. The cam body is rotatable about a rotation axis, and shifts in the rearward direction when the actuator rotates. The cam body includes a rear wall surface opposite to the cancel cam. The rear wall surface has two end parts symmetrical to each other with respect to the longitudinal axis. A spring elastically contacts the end parts to urge the cam body in the rearward direction. The spring also urges the cam body in a rotating direction about the rotation axis when the longitudinal axis of the cam body rotates. The turning direction indicator device suppresses a hitting noise produced by the cam body and a release element with such a simple structure, and operates reliably.

8 Claims, 14 Drawing Sheets

TURNING DIRECTION INDICATOR DEVICE

FIELD OF THE INVENTION

The present invention relates to a turning direction indicator device that is often installed near a steering wheel of an automobile to flash on and off turn-signal lamps according to an operation of an operating lever.

BACKGROUND OF THE INVENTION

In recent years, a turning direction indicator device that flashes on and off turn-signal lamps according to an operation of an operating lever installed in an automobile is demanded to produce a low noise. A large operation noise may be produced in the case that a driver rotates the operating lever in a turning direction and retains it in a position for indicating the turning direction, or the case that the operating lever is automatically returned to a neutral position in accordance with a rotating operation of the steering wheel.

FIGS. 8 and 9 are a partial cutaway view and an exploded perspective view of conventional turning direction indicator device 501, respectively. Turning direction indicator device 501 includes actuator 1 and cover 2 for accommodating actuator 1. Shaft part 1A provided on an upper surface of actuator 1 is pivotally supported by bearing part 2A at a front side lower surface of cover 2, such that actuator 1 is rotatable in rightward and leftward rotation directions.

At a tip of operating lever 3, substantially cylindrical operating part 3A is provided. At a root of operating lever 3, driver part 3B that extends from operating part 3A toward actuator 1 is provided.

Shaft part 3C provided at each side of driver part 3B is pivotally supported by shaft hole 1B provided in a front part of actuator 1, whereby operating lever 3 is attached to actuator 1 so as to be rotatable in upward and downward directions.

Cam body 5 is placed on an upper surface of actuator 1. Cam body 5 includes base part 5A having a substantially elongated circular shape, upper shaft part 5B provided on an upper surface of base part 5A, lower shaft part 5C provided on a lower surface of base part 5A, front cam part 5D projecting from a front part of base part 5A, and rear cam part 5E projecting from a rear part of base part 5A. Lower shaft part 5C extends coaxially with upper shaft part 5B.

Guide groove 2B is provided in a lower surface of cover 2. Guide groove 2B has an elongated hole shape extending in frontward and rearward directions, and is concave upward. Upper shaft part 5B engages with guide groove 2B, whereby cam body 5 is retained with cover 2 so as to be capable of shifting in the frontward and rearward directions and rotating.

Grease is applied between an upper surface of cam body 5 and the lower surface of cover 2, to reduce the sliding friction between the lower surface of cover 2 and the upper surface of cam body 5. Further, resistance due to, e.g. viscosity of the grease suppresses a rapid movement of cam body 5.

Both ends of urging spring 6, a coil spring, are engaged at predetermined positions on the lower surface of cover 2. Engaging recess 5F is provided in the lower surface of cam body 5. The substantially center part of urging spring 6 engages with engaging recess 5F of cam body 5, to urge cam body 5 in the rearward direction.

Release element 7 has release projecting parts 7A that project from opposite ends of release element 7 in the rearward direction, to form a substantially squared C-shape. Release element 7 is retained substantially at the middle of the upper surface of actuator 1.

Hole 1F provided in a rear end part of actuator 1 accommodates click spring 9A together with click pin 9B therein while click spring 9A is compressed. Click pin 9B faces click cam 2D of cover 2. Click pin 9B elastically contacts click cam 2D. Click spring 9A and click pin 9B constitute retainer unit 9 that retains actuator 1 at the neutral position of operating lever 3. When operating lever 3 rotates in rightward and leftward rotation directions, retainer unit 9 moves while giving a click feel, and retains actuator 1 at predetermined positions in the rightward and leftward rotation directions.

Case 10 opens upward. Case 10 pivotally supports actuator 1 such that actuator 1 is rotatable coaxially with shaft part 1A. Further, case 10 covers an opening of cover 2 that opens downward, to accommodate actuator 1 having operating lever 3 attached thereto.

Wiring patterns are formed on upper and lower surfaces of wiring board 11 made of an insulating resin. An upper end of slider 12 engages with driver recess 1G of actuator 1. A fixed contact is disposed at a predetermined place on wiring board 11. Switch contact part 12A is structured, in which movable contact 12B fixed to the lower surface of slider 12 slides on the fixed contact while elastically contacting thereto to perform electrical connection and disconnection between movable contact 12B and the fixed contact.

Rotation of actuator 1 associated with a rightward or leftward rotation operation of operating lever 3 causes electrical connection and disconnection of switch contact part 12A. Bottom plate 13 covers the lower surface of wiring board 11, to structure turning direction indicator device 501.

FIGS. 10A to 10C are top schematic views of turning direction indicator device 501 for illustrating an operation of turning direction indicator device 501. As shown in FIG. 10A, engaging recess 5F includes front wall surface 5H having a substantially flat shape and rear wall surface 5G facing front wall surface 5H. Rear wall surface 5G projects in a substantially semicircular shape, and has substantially the same lateral width as that of front wall surface 5H.

A minimum distance between front wall surface 5H and rear wall surface 5G is equal to or slightly wider than an outer diameter of urging spring 6. Urging spring 6 elastically contacts rear wall surface 5G, and urges cam body 5 in the rearward direction.

Turning direction indicator device 501 is installed below the steering wheel located in front of a driver's seat in an automobile, such that operating part 3A projects outward. Substantially arcuate cancel cams 20 rotate in accordance with the rotation of a steering shaft. Cancel cams 20 are disposed near the rear side of actuator 1. Rear cam part 5E of cam body 5 projects outward from opening 2C (see FIG. 9) of cover 2. A lead wire for external connection is connected to connector part 11A of wiring board 11, and connects switch contact part 12A electrically to an electronic circuit of the automobile. Retainer cam 1E has a substantially triangular shape having an apex and opposite end parts.

As shown in FIG. 10A, when operating lever 3 is retained at the neutral position, cam body 5 is urged by urging spring 6 in the rearward direction, which is directed toward cancel cam 20. Here, lower shaft part 5C elastically contacts the apex of retainer cam 1E, and rear cam part 5E is at a non-abutting position which is outwardly away from a rotary orbit of cancel cams 20. Here, front cam part 5D is at substantially the intermediate position between release projecting parts 7A positioned at the opposite ends of release element 7.

As shown in FIG. 10B, when the driver rotates operating lever 3 in the rightward direction upon turning the automobile rightward, operating lever 3 rotates with actuator 1 about shaft part 1A of actuator 1. Actuator 1 is retained by retainer unit 9 (see FIG. 9) at a first operational position where actuator 1 has rotated rightward by a predetermined angle. Here, lower shaft part 5C of cam body 5 slides on an angled edge of retainer cam 1E from the apex while maintaining elastic contact, to approach one of the opposite end parts of retainer cam 1E.

Similarly, when operating lever 3 is rotated in the leftward direction, actuator 1 is retained by retainer unit 9 (see FIG. 9) at a second operational position where actuator 1 has rotated in the leftward direction by a predetermined angle. Here, lower shaft part 5C of cam body 5 slides on the angled edge of retainer cam 1E from the apex while maintaining elastic contact, to approach the other one of the opposite end parts of retainer cam 1E.

Then, when actuator 1 is retained at the first operational position, rear cam part 5E of cam body 5 recedes to be positioned on the rotary orbit of cancel cams 20, i.e., an abuttable position. At this time, urging spring 6 elastically contacts substantially semicircular rear wall surface 5G and slightly urges front cam part 5D in the rightward rotating direction. A tip of urged front cam part 5D elastically contacts an inner side surface of release projecting part 7A of release element 7.

In accordance with the rotation of actuator 1, switch contact part 12A performs electrical connection and disconnection to produce an electric signal, based on which the electronic circuit of the automobile flashes on and off a right turn-signal lamp of the automobile.

Next, as shown in FIG. 10C, when the driver rotates the steering wheel in the rightward rotation direction for turning the automobile rightward, cancel cams 20 rotates as the steering wheel rotate in the rightward rotation direction. The rightward rotation of cancel cams 20 causes cancel cam 20 to abut on rear cam part 5E of cam body 5. Then, cam body 5 rotates in the leftward rotation direction about upper shaft part 5B. Here, front cam part 5D is removed away from release projecting part 7A, while enhancing the in the rightward rotation urging force attributed to bending of urging spring 6 engaged with engaging recess 5F.

Further, as this in the rightward rotation operation of the steering wheel further proceeds, rear cam part 5E is removed from cancel cam 20. Thus, the rightward rotation of cam body 5 caused by cancel cam 20 is released. Here, cam body 5 is urged by urging spring 6 so as to rotate in the rightward rotation direction, and, as shown in FIG. 10B, front cam part 5D hits the inner side surface of release projecting part 7A positioned on the right side of release element 7.

Grease is applied between the upper surface of cam body 5 and the lower surface of cover 2. The upper surface of base part 5A of cam body 5 slides on the lower surface of cover 2. When used for a long period under various environments in terms of changes in temperature, humidity and the like, the grease between the upper surface of base part 5A of cam body 5 and the lower surface of cover 2 is expelled from the sliding range toward the outside. This reduces the resistance due to the grease exerted over the operation of cam body 5 and causes front cam part 5D to hit release projecting part 7A with a relatively large impact force, which is prone to result in a large hitting noise.

When the driver finishes turning the automobile and is to return the steering wheel to an original neutral position, the steering wheel is rotated in the opposite direction, i.e., the in the leftward rotation direction. This rotation of the steering wheel in the rightward rotation direction allows cancel cams 20 in the state shown in FIG. 10B to rotate in the leftward rotation direction, whereby cancel cam 20 pushes rear cam part 5E. Thus, cam body 5 rotates in the rightward rotation direction about upper shaft part 5B. Here, the right end of front cam part 5D rotates actuator 1 in the leftward rotation direction. Thus, as shown in FIG. 11A, the neutral state is recovered in which actuator 1 and operating lever 3 return to the neutral position and retained there, and the turn-signal lamp having been flashing on and off is turned off.

In conventional turning direction indicator device 501, actuator 1 is retained at the first operational position and the second operational position, front cam part 5D of cam body 5 elastically contacts release projecting part 7A of release element 7. In this state, when the steering wheel is further rotated in the same rotating direction as the rotating direction of operating lever 3, rear cam part 5E of cam body 5 pressed by cancel cam 20 is removed away from cancel cam 20. Here, cam body 5 is rotated and urged by urging force of urging spring 6 which is engaged in engaging recess part 5F while the spring is bent. Front cam part 5D of cam body 5 which is rotated and urged hits release projecting part 7A with relatively great impact force, which is prone to result in a great hitting noise.

A turning direction indicator device similar to conventional turning direction indicator device 501 is disclosed in Japanese Patent Laid-Open Publication No. 08-167345.

SUMMARY OF THE INVENTION

A turning direction indicator device includes an actuator that rotates by an operation of the operating lever so as to be positioned at a neutral position and an operational position, a cam body that shifts in a rearward direction approaching a cancel cam, an urging spring, and a release element rotating together with the actuator. The cam body that is rotatable about a rotation axis, and shifts in the rearward direction when the actuator shifts rotates from the neutral position to the operational position. The cam body includes a rear wall surface that opens in a direction away from the cancel cam. The rear wall surface of the cam body has two end parts which are symmetrical to each other with respect to the longitudinal axis. The urging spring is operable to elastically contact the end parts of the rear wall surface of the cam body to urge the cam body in the rearward direction. The urging spring is operable to urge the cam body in a rotating direction about the rotation axis when the longitudinal axis of the cam body rotates about the rotation axis.

The turning direction indicator device suppresses a hitting noise produced by the cam body and the release element with such a simple structure, and operates reliably.

DETAILED DESCRIPTION OF PREFERRED EMBODIMENT

Figure 1:
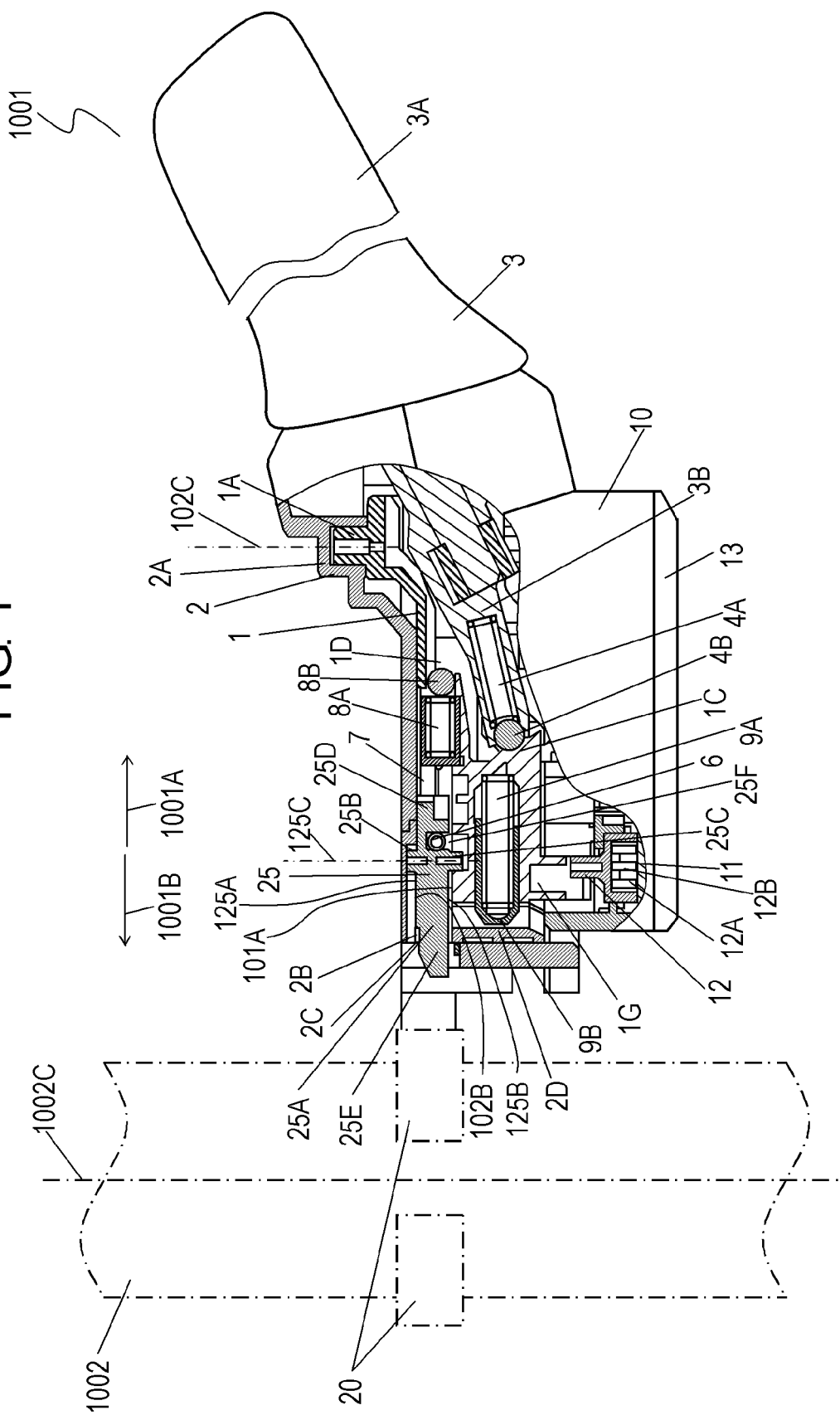
FIG. 1 is a partial cutaway view of a turning direction indicator device according to an exemplary embodiment of the present invention.
Figure 2:
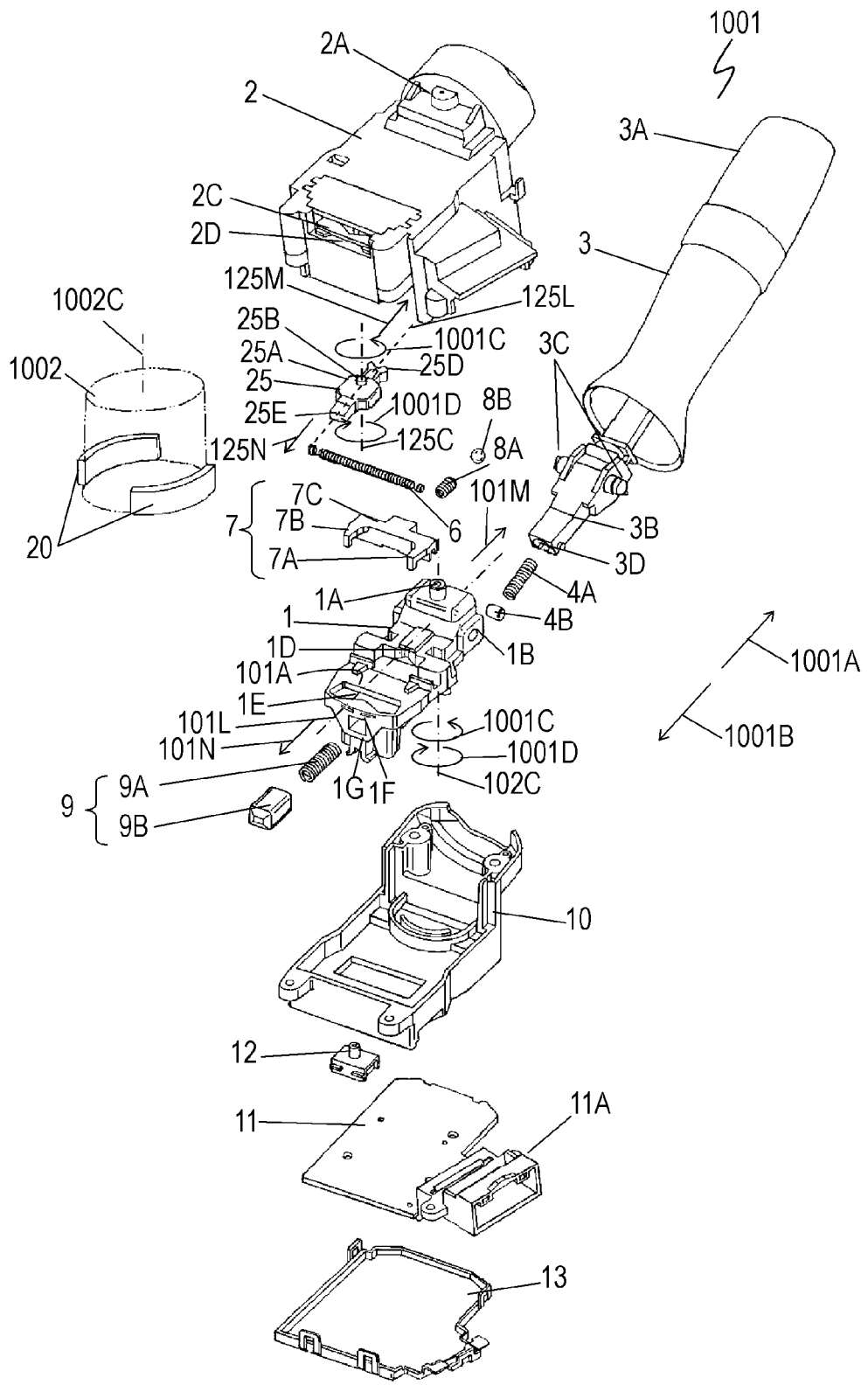
FIG. 2 is an exploded perspective view of the turning direction indicator device according to the embodiment.

FIGS. 1 and 2 are a partial cutaway view and an exploded perspective view of turning direction indicator device 1001 according to an exemplary embodiment of the present invention, respectively. Turning direction indicator device 1001 is installed below a steering wheel located in front of a driver's seat in an automobile. Steering shaft 1002 rotates in accordance with a rotation of the steering wheel rotated by a driver. Cancel cams 20 rotate about rotation axis 1002C as steering shaft 1002 rotates. Actuator 1 is made of an insulating resin, such as polyoxymethylene. Cover 2 having a substantially box shape is made of an insulating resin, such as polyamide. Cover 2 accommodates actuator 1 therein. Actuator 1 includes shaft part 1A projecting from an upper surface and extending along rotation axis 102C. Rotation axis 102C is parallel to rotation axis 1002C. Bearing part 2A that is concave upward is provided at a front side lower surface of cover 2. Bearing part 2A pivotally supports shaft part 1A of actuator 1. Actuator 1 is rotatable with reference to cover 2 about rotation axis 102C along which shaft part 1A extends, in leftward rotation direction 1001C and rightward rotation direction 1001D opposite to leftward rotation direction 1001C.

Operating lever 3 is made of an insulating resin, such as ABS resin or polyamide. At a tip of operating lever 3, substantially cylindrical operating part 3A is provided. At a root of operating lever 3, driver part 3B that extends from operating part 3A toward actuator 1 is provided.

Shaft part 3C projects from each side of driver part 3B. Each shaft part 3C is pivotally supported by shaft hole 1B provided in each side surface of the front part of actuator 1. Hole 3D is provided in an end of driver part 3B. Click spring 4A and click pin 4B are inserted into hole 3D. Click pin 4B elastically contacts uneven-shaped click cam 1C that is provided at the lower part of actuator 1. Click spring 4A, click pin 4B, and click cam 1C attach operating lever 3 to actuator 1 such that operating lever 3 can rotate upward and downward about shaft part 3C with a click feel.

Cam body 25 made of an insulating resin, such as polyoxymethylene, is placed on upper surface 101A of actuator 1. Cam body 25 has upper surface 125A and lower surface 125B opposite to upper surface 125A. Cam body 25 includes base part 25A, upper shaft part 25B projecting from upper surface 125A at base part 25A, lower shaft part 25C projecting from lower surface 125B and extending coaxially with upper shaft part 25B, rear cam part 25E projecting and extending from base part 25A, and front cam part 25D projecting and extending from base part 25A. Rear cam part 25E projects and extends from base part 25A in direction 125N approaching cancel cam 20 along longitudinal axis 125L. Front cam part 25D projects and extends from base part 25A in direction 125M opposite to rearward direction 125N along longitudinal axis 125L. Upper shaft part 25B and lower shaft part 25C project from upper surface 125A and lower surface 125B at base part 25A, respectively, and extend along rotation axis 125C that is parallel to rotation axis 1002C. Longitudinal axis 125L is rotatable about rotation axis 125C in leftward rotation direction 1001C and rightward rotation direction 1001D.

Figure 3:
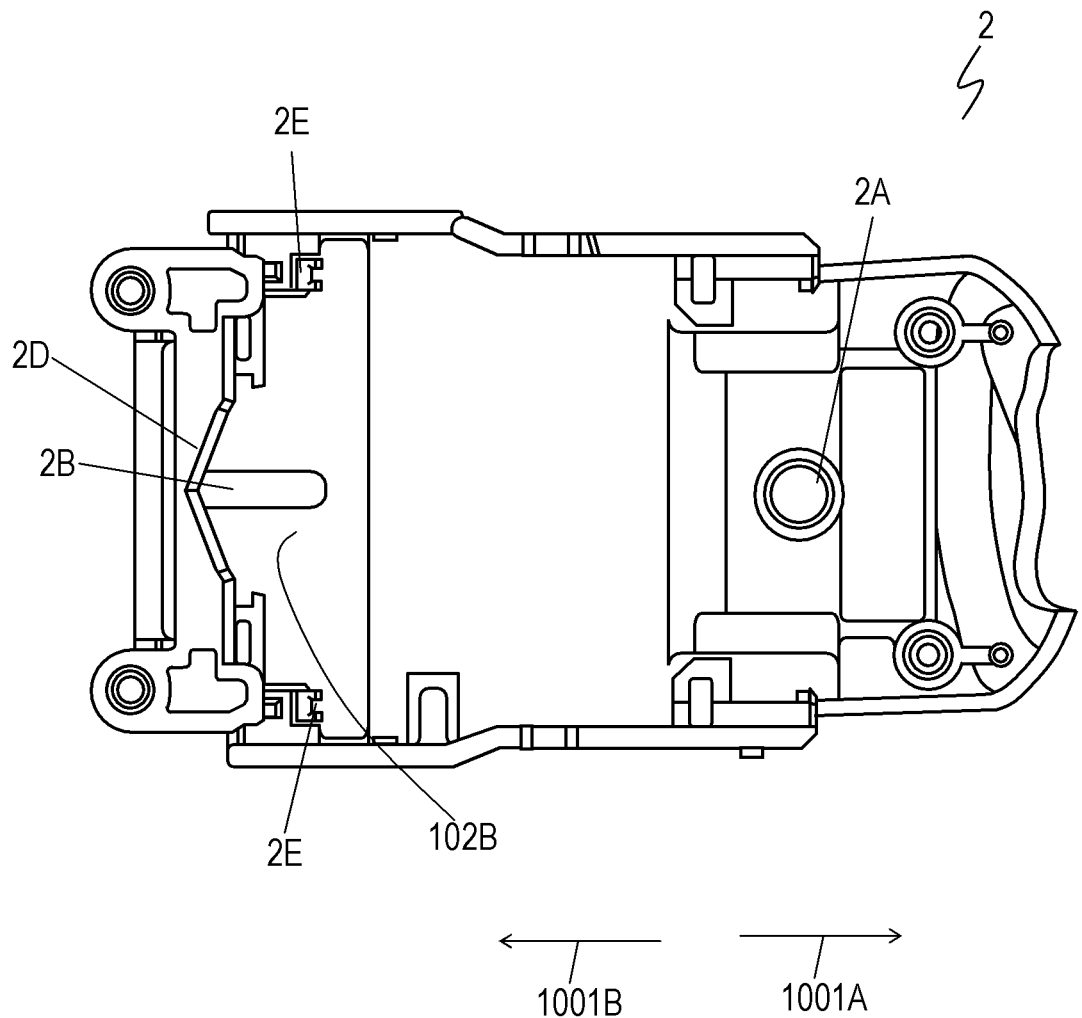
FIG. 3 is a bottom view of a cover of the turning direction indicator device according to the embodiment.

FIG. 3 is a bottom view of cover 2. Long hole-shaped guide groove 2B provided in lower surface 102B of cover 2 extends in direction 1001A (1001B) and is concave upward. Upper shaft part 25B of cam body 25 is engaged with guide groove 2B, whereby cam body 25 is retained at cover 2 so as to be capable of shifting in frontward direction 1001A and rearward direction 1001B. That is, upper shaft part 25B, lower shaft part 25C, and rotation axis 125C of cam body 25 can shift in frontward direction 1001A and rearward direction 1001B with respect to cover 2 along guide groove 2B. Cam body 25 is rotatable in leftward rotation direction 1001C and rightward rotation direction 1001D with respect to cover 2 about rotation axis 125C along which upper shaft part 25B and lower shaft part 25C extend. While upper shaft part 25B is engaged with guide groove 2B, longitudinal axis 255L is rotatable about rotation axis 125C in leftward rotation direction 1001C and rightward rotation direction 1001D.

Grease is applied between upper surface 125A of cam body 25 and lower surface 102B of cover 2, so as to avoid sliding friction between lower surface 102B of cover 2 and upper surface 125A of cam body 25. Grease suppresses any rapid movement of cam body 25 by resistance due to, e.g. viscosity of the grease.

Opposite ends of urging spring 6 having a coil shape are engaged with two engaging parts 2E provided on the bottom surface of cover 2. Two engaging parts 2E are disposed in a direction perpendicular to direction 1001A (1001B) along which guide groove 2B extends. The center part of urging spring 6 is engaged with engaging recess 25F of cam body 25 to urge cam body 25 in the rearward direction 1001B.

Figure 4A:
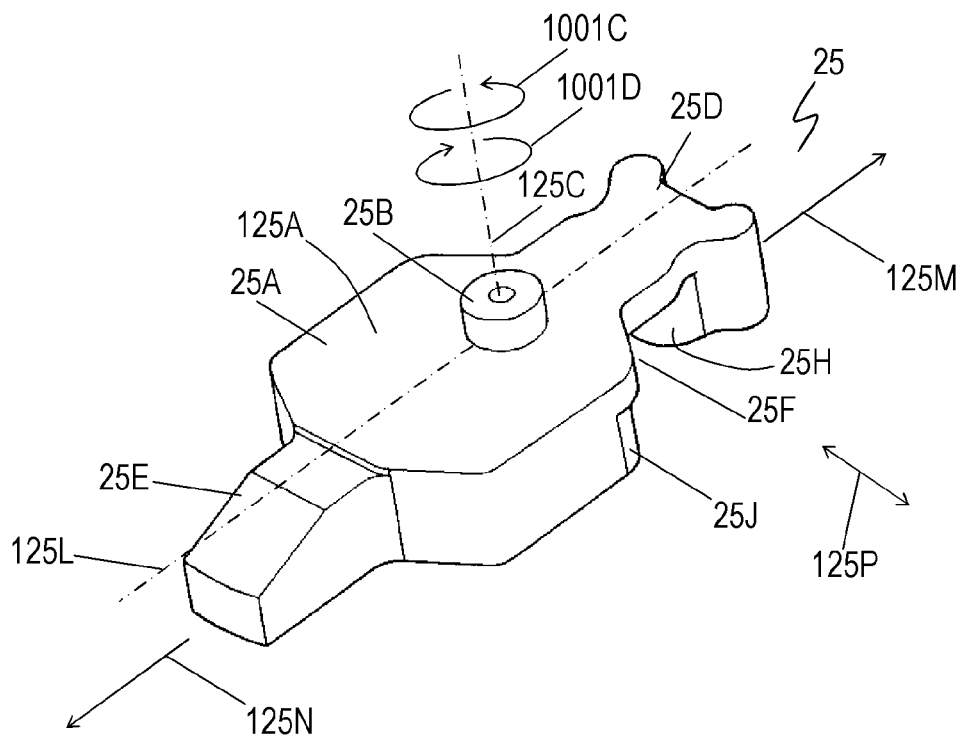
FIGS. 4A and 4B are a top perspective view and a bottom perspective view of a cam body of the turning direction indicator device according to the embodiment, respectively.
Figure 4B:
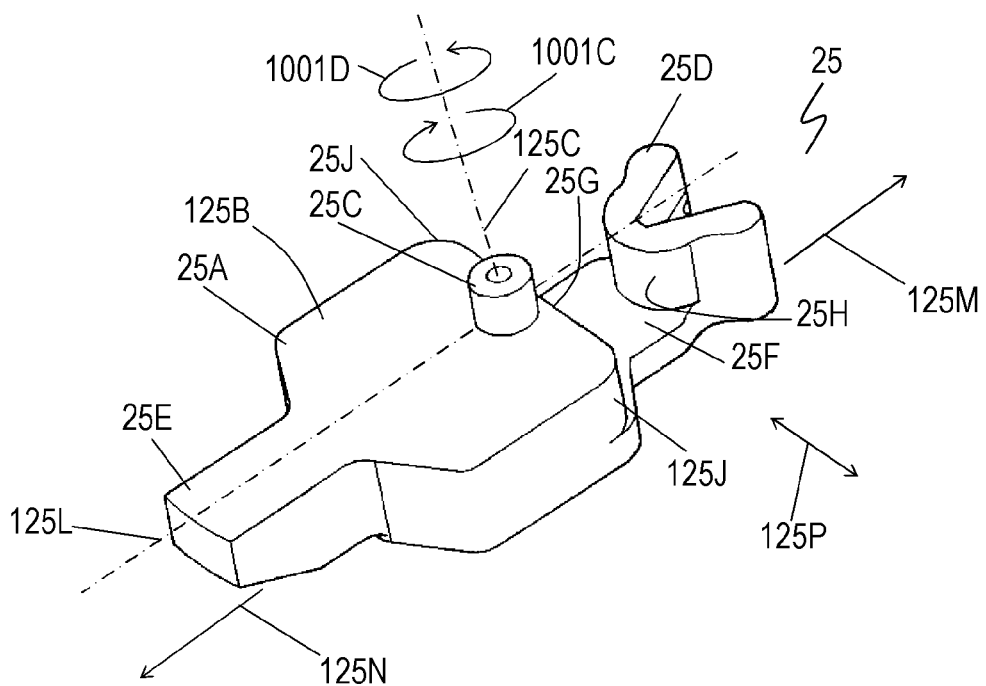

FIGS. 4A and 4B are a top perspective view and a bottom perspective view of cam body 25, respectively. Upper surface 125A of base part 25A has a shape, such as an elongated circular shape or a racetrack shape, elongated in longitudinal axis 125L. Rear cam part 25E projects from base part 25A to extend in direction 125N approaching cancel cam 20 along longitudinal axis 125L. Front cam part 25D projects from base part 25A to extend in direction 125M opposite to direction 125N along longitudinal axis 125L. Upper shaft part 25B and lower shaft part 25C project from upper surface 125A and lower surface 125B at base part 25A along rotation axis 125C, respectively. Engaging recess 25F is provided in lower surface 125B of cam body 25, and positioned in direction 125M from lower shaft part 25C. Engaging recess 25F extends in direction 125P perpendicular to rotation axis 125C and longitudinal axis 125L. Engaging recess 25F has front wall surface 25H and rear wall surface 25G facing each other at prescribed intervals in a direction of longitudinal axis 125L. Rear wall surface 25G opens in direction 125M. Cam body 25 has end parts 25J and 125J arranged in direction 125P. End parts 25J and 125J are positioned symmetrically to each other with respect to longitudinal axis 125L. Rear wall surface 25G has a flat shape and front wall surface 25H has an arcuate shape. Urging spring 6 passing through engaging recess 25F elastically contacts rear wall surface 25G (see FIG. 1).

Longitudinal axis 125L of cam body 25 extends in a center line direction of cam body 25 connecting a width center of front cam part 25D and a width center of rear cam part 25E.

A distance between rear wall surface 25G and front wall surface 25H is determined to be a value allowing urging spring 6 to slightly abut on front wall surface 25H when cam body 25 rotates about rotation axis 125C by the maximum rotatable angle in rotating directions 1001C and 1001D.

As shown in FIGS. 1 and 2, release element 7 is made of an insulating resin, such as polyoxymethylene, and held at actuator 1 such that release element 7 is rotatable together with actuator 1 in rotation directions 1001C and 1001D about rotation axis 102C. Release element 7 includes coupling part 7C and release projecting parts 7A and 7B that project from respective ones of the opposite ends of coupling part 7C in direction 101N approaching cancel cam 20 along reference axis 101L to form a substantially squared C-shape opening in direction 101N. Coupling part 7C has a hole therein that opens in direction 101M opposite to direction 101N. The hole accommodates retaining spring 8A and ball 8B therein. Ball 8B faces and elastically contacts retaining recess 1D of actuator 1. Release element 7 is coupled to actuator 1, and rotates together with actuator 1 about shaft part 1A (rotation axis 102C). Release element 7 is retained substantially on the middle of upper surface 101A of actuator 1, so as to be capable of shifting in directions perpendicular to reference axis 101L along upper surface 101A with a load equal to or larger than a predetermined load.

Hole 1F that opens in direction 101N is provided in the end part of actuator 1. Hole 1F of actuator 1 accommodates therein click pin 9B and click spring 9A which is compressed. Click pin 9B faces and elastically contacts click cam 2D of cover 2. Click spring 9A, click pin 9B, and click cam 2D constitute retainer unit 9. When operating lever 3 rotates in rotation directions 1001C and 1001D, retainer unit 9 retains actuator 1 at the neutral position, the first operational position, and the second operational position while giving a click feel.

Case 10 opens upward, and is made of an insulating resin, such as polybutylene terephthalate. Case 10 pivotally supports actuator 1 so as to allow actuator 1 to rotate about rotation axis 102C. Case 10 covers an opening of cover 2 that opens downward, to accommodate components, such as actuator 1 having operating lever 3 attached thereto and cam body 25.

Wiring patterns are formed on upper and lower surfaces of wiring board 11 made of an insulating resin. A fixed contact is provided on the upper surface. Connector part 11A is provided on wiring board 11. The upper end of slider 12 engages with driver recess 1G of actuator 1. Movable contact 12B fixed to the lower surface of slider 12 slides while elastically contacting the fixed contact, thereby performing electrical connection and disconnection between movable contact 12B and fixed contact. Movable contact 12B and the fixed contact constitute switch contact part 12A.

Rotation of actuator 1 associated with the rotation of operating lever 3 in rotation directions 1001C and 1001D causes electrical connection and disconnection of switch contact part 12A. Bottom plate 13 covers the lower surface of wiring board 11, to structure turning direction indicator device 1001.

Figure 4C:
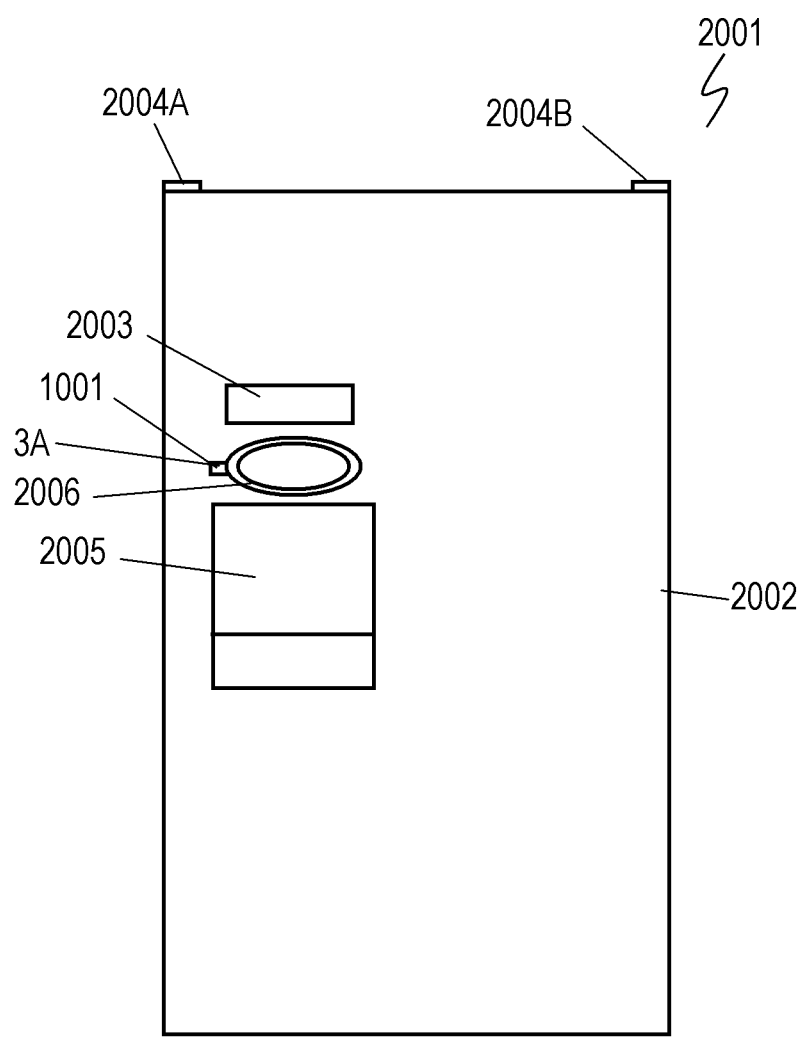
FIG. 4C is a top schematic view of an automobile having the turning direction indicator device according to the embodiment installed therein.

FIG. 4C is a top schematic view of automobile 2001 having turning direction indicator device 1001 installed therein. Automobile 2001 includes vehicle body 2002, turn-signal lamps 2004A and 2004B installed onto vehicle body 2002, driver's seat 2005 installed in vehicle body 2002, steering wheel 2006 located in front of driver's seat 2005, and electronic circuit 2003. Turning direction indicator device 1001 is installed below steering wheel 2006 while operating part 3A projects outward. As shown in FIGS. 2 and 4C, a lead or the like for external connection is coupled to connector part 11A of wiring board 11, and switch contact part 12A is electrically connected to electronic circuit 2003 of automobile 2001.

Figure 5A:
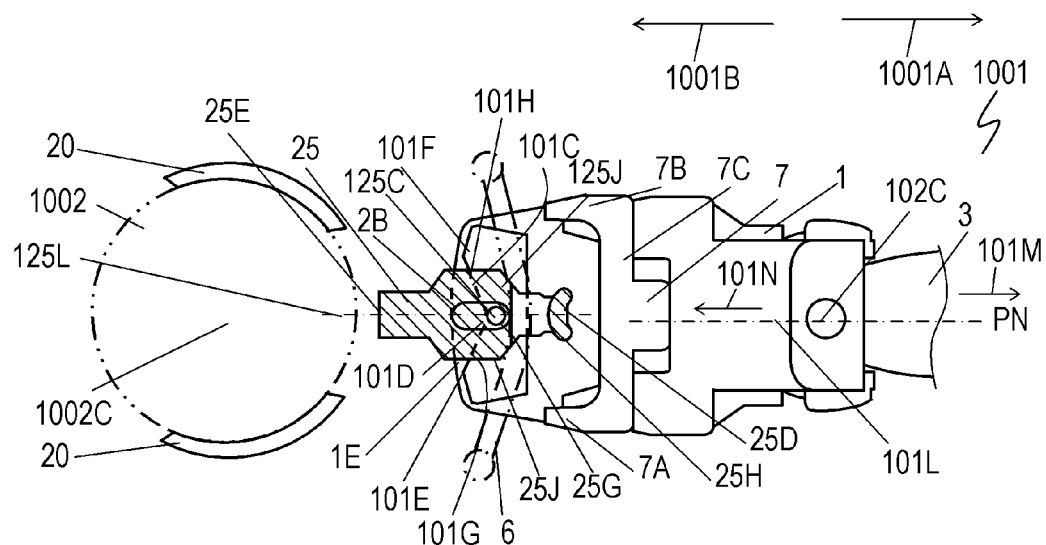
FIGS. 5A to 5D are top schematic views of the turning direction indicator device according to the embodiment for illustrating an operation of the turning direction indicator device.

FIGS. 5A to 5D are top schematic views of turning direction indicator device 1001 for describing an operation of turning direction indicator device 1001. Actuator 1 includes retainer cam 1E that is located in direction 101N approaching cancel cam 20 from shaft part 1A (rotation axis 102C) along reference axis 101L. Retainer cam 1E has edge 101C. Retainer cam 1E has a substantially triangular shape having apex 101D projecting in direction 101M opposite to direction 101N, and end parts 101E and 101F. Edge 101C includes straight angled edge 101G that extends from apex 101D to end part 101E, and straight angled edge 101H that extends from apex 101D to end part 101F. As shown in FIG. 5A, when operating lever 3 is retained at neutral position PN, cam body 25 is urged with urging spring 6 that elastically contacts rear wall surface 25G of engaging recess 25F in rearward direction 1001B toward rotation axis 1002C (cancel cam 20). Here, lower shaft part 25C elastically contacts apex 101D of retainer cam 1E, and rear cam part 25E is positioned at a non-abutting position where rear cam part 25E is located outwardly away from a rotary orbit of cancel cams 20 and cannot abut on cancel cams 20. Front cam part 25D is located at substantially the intermediate position between release projecting parts 7A and 7B of release element 7. At neutral position PN, cam body 25 is retained with urging spring 6 such that longitudinal axis 125L of cam body 25 is parallel to direction 1001A (1001B) along which guide groove 2B of cover 2 extends.

Figure 5B:
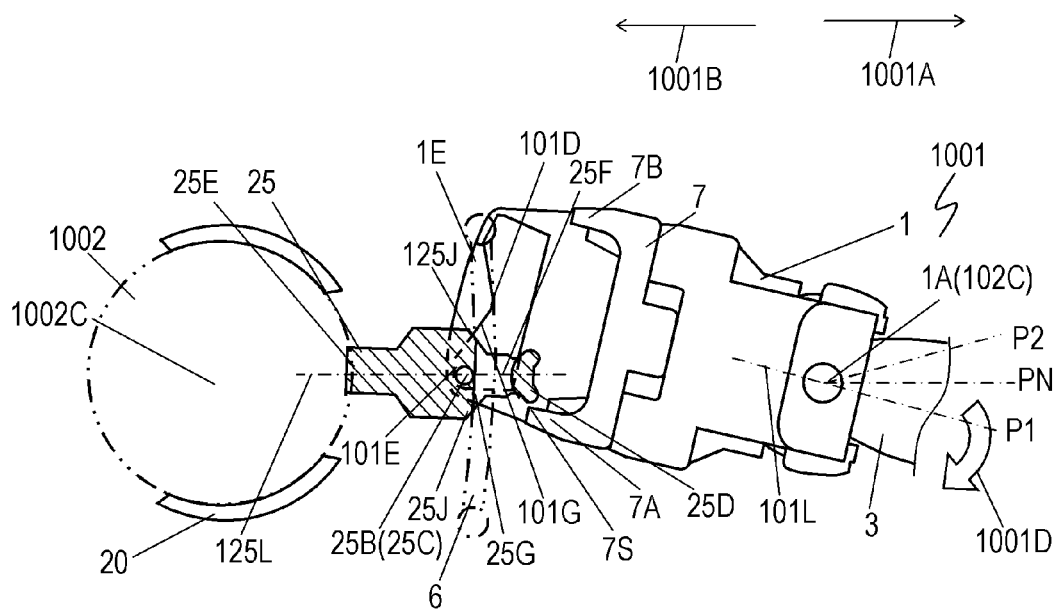

For example, when the driver rotates operating lever 3 in rightward rotation direction 1001D upon turning the automobile rightward, as shown in FIG. 5B, operating lever 3 rotates together with actuator 1 about shaft part 1A of actuator 1. Then, actuator 1 is retained by retainer unit 9 (see FIG. 2) at first operational position P1 where actuator 1 has rotated in rightward rotation direction 1001D by a predetermined angle, and operating lever 3 is retained at first operational position P1. At this time, release projecting part 7A rotates about rotation axis 102C in rightward rotation direction 1001D and approaches front cam part 25D of cam body 25.

When actuator 1 is retained at first operational position P1, lower shaft part 25C of cam body 25 shifts from apex 101D to end part 101E of retainer cam 1E in rearward direction 1001B by urging force of urging spring 6 in rearward direction 1001B while elastically contacting and sliding on angled edge 101G. This shifting causes rear cam part 25E to recede to be positioned on the rotary orbit of cancel cams 20, i.e., an abuttable position where rear cam part 25E can abut on cancel cam 20.

Here, urging spring 6 substantially elastically contacts flat, rear wall surface 25G of cam body 25 linearly, and applies moments having the same magnitudes to end parts 25J and 125J about rotation axis 125C in opposite directions. Therefore, cam body 25 does not rotate about rotation axis 125C even by a certain amount of impact or vibration, and cam body 25 stably shifts in direction 1001B while longitudinal axis 125L is parallel to direction 1001B (1001A).

As shown in FIG. 5B, front cam part 25D of cam body 25 is located away from an inner side surface of release projecting part 7A by predetermined interval 7S while longitudinal axis 125L is retained in parallel to direction 1001B (1001A).

In accordance with the rotation of operating lever 3 and actuator 1 from neutral position PN to first operational position P1, slider 12 engaged with driver recess 1G slides on wiring board 11, thereby performing electrical connection and disconnection of switch contact part 12A (see FIGS. 1 and 2). An electric signal produced by the electrical connection and disconnection of switch contact part 12A allows electronic circuit 2003 to flash on and off the right turn-signal lamp 2004B (see FIG. 4C).

Figure 5C:
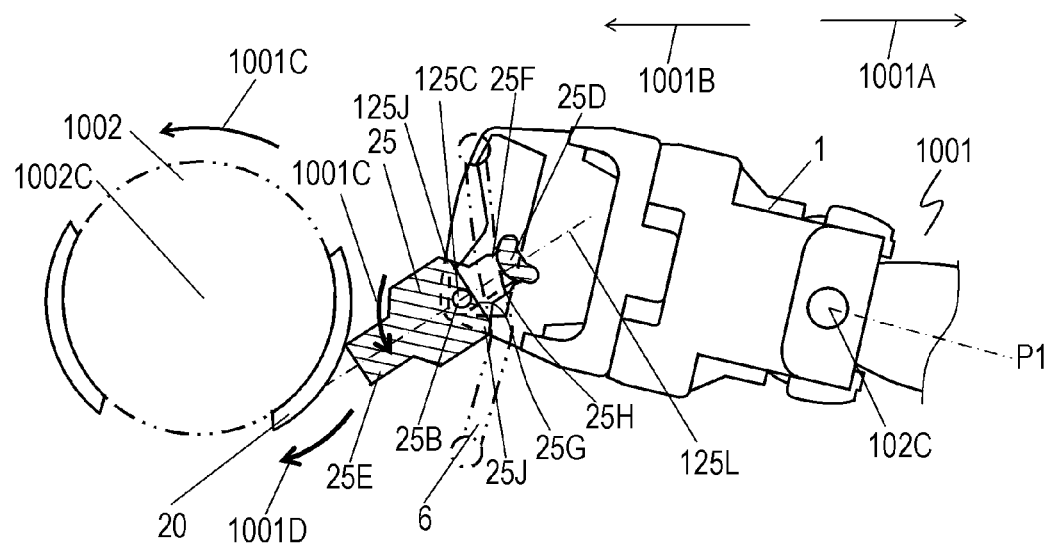

Next, the driver rotates steering wheel 2006 in a rightward rotation direction for turning the automobile 2001 rightward. At this time, as shown in FIG. 5C, cancel cams 20 rotate in rightward rotation direction 1001D about rotation axis 1002C as steering wheel 2006 and steering shaft 1002 rotate. Accordingly, cancel cam 20 abuts on rear cam part 25E of cam body 25, and then, rotates cam body 25 in leftward rotation direction 1001C about upper shaft part 25B (rotation axis 125C). At this time, cancel cam 20 restricts the rotation of cam body 25 in rotation direction 1001D which is opposite to rotation direction 1001C. In accordance with the rotation of cam body 25, urging spring 6 engaged with engaging recess 25F is pushed with end part 25J of rear wall surface 25G to bend, and front cam part 25D is removed away from release projecting part 7A to rotate cam body 25 in rotation direction 1001C while increasing an urging force of spring 6 in rightward rotation direction 1001D which is opposite to direction 1001C.

When cam body 25 is rotated by cancel cam 20 to a maximum rotation position in rotating direction 1001C, urging spring 6 elastically contacts right end part 25J of rear wall surface 25G to enhance urging force in rotation direction 1001D which is opposite to rotation direction 1001C. Here, urging spring 6 only slightly abut on front wall surface 25H, and does not substantially receive urging force from front wall surface 25H.

Figure 10A:
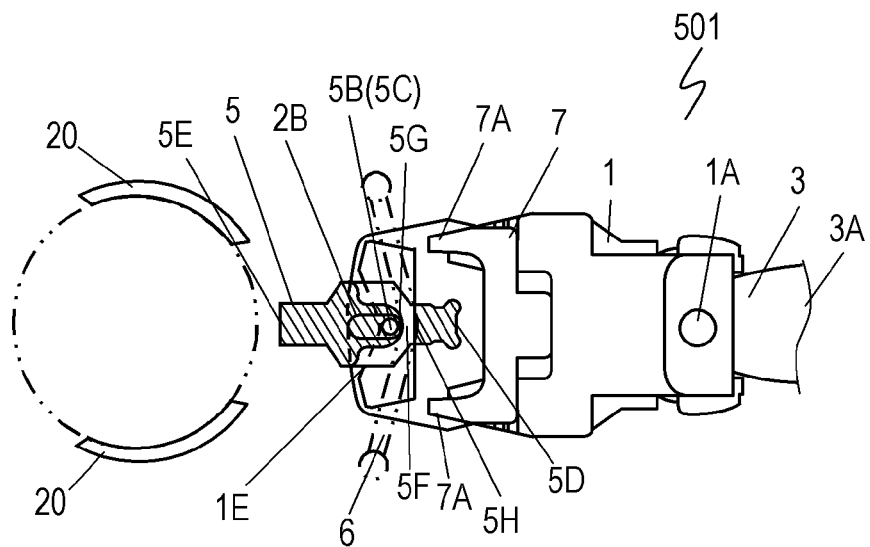
FIGS. 10A and 10C are top schematic views of the conventional turning direction indicator device for illustrating an operation of the conventional turning direction indicator device.
Figure 10B:
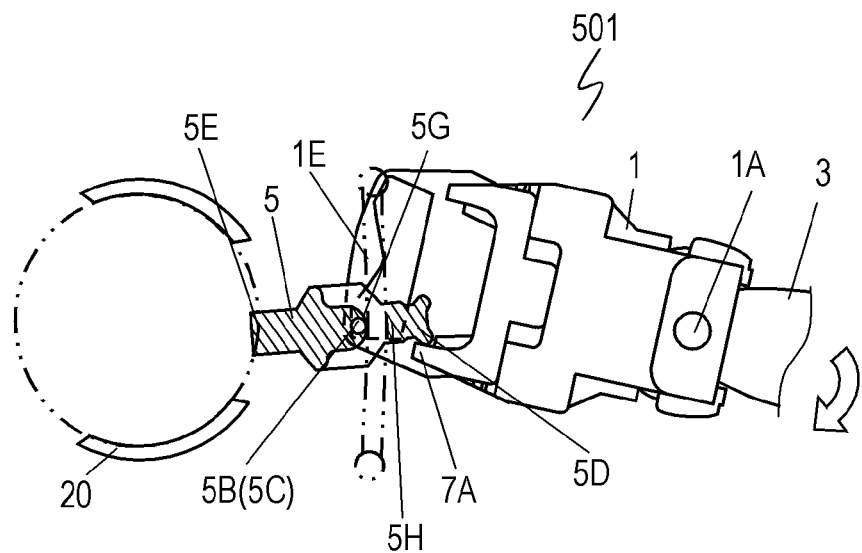
Figure 10C:
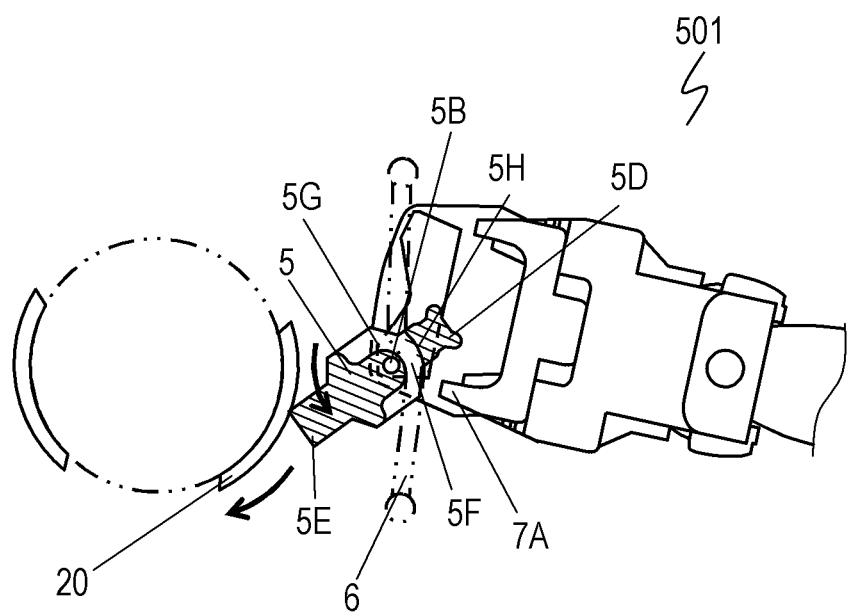

In the conventional turning direction indicator 501 shown in FIGS. 10A to 10C, urging spring 6 is sandwiched between substantially flat front wall surface 5H and substantially semicircular rear wall surface 5G of cam body 5 and bent. In this state, urging force on cam body 5 in the rightward rotation direction is enhanced. In turning direction indicator device 1001 of the embodiment, urging spring 6 elastically contacts substantially arcuate end part 25J (or end part 125J) of rear wall surface 25G. End part 25J (125J) of rear wall surface 25G is closer to rotation axis 125C than front wall surface 25H is. Therefore, moment received by cam body 25 from urging spring 6 is smaller than that received by conventional cam body 5. Thus, urging force from urging spring 6 received by cam body 25 does not become excessive large, and it is easy to set the urging force to an appropriate level.

Figure 5D:
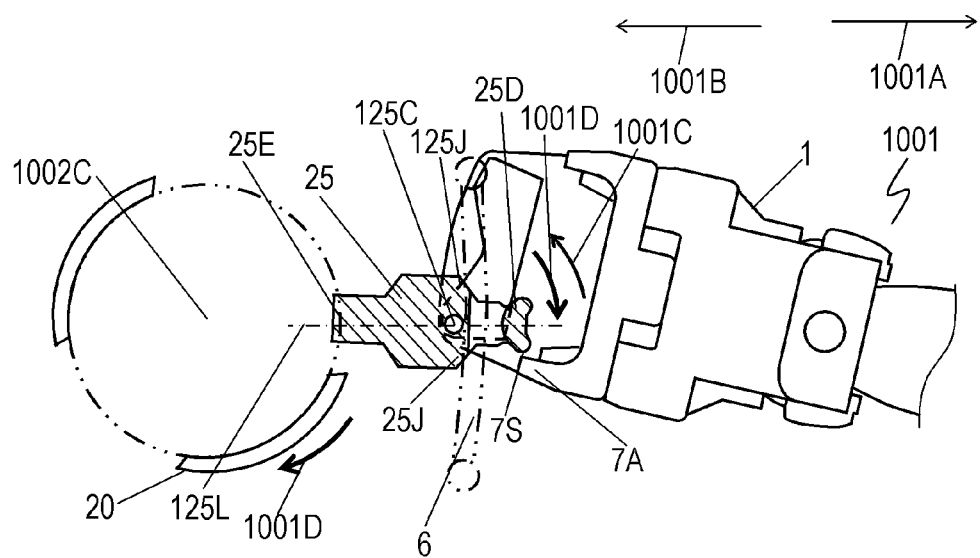

As the steering wheel is rotated further in the rightward rotation direction, as shown in FIG. 5D, rear cam part 25E elastically contacting cancel cam 20 is removed away from cancel cam 20. This movement releases the restriction of the rightward rotation of cam body 25 in direction 1001D caused by cancel cam 20. Accordingly, cam body 25 is urged by urging spring 6 in rightward rotation direction 1001D, and consequently, rotates in rightward rotation direction 1001D.

When cam body 25 rotates until longitudinal axis 125L of cam body 25 become parallel to direction 1001A (1001B), urging spring 6 elastically contacts entire rear wall surface 25G, that is, urging spring 6 elastically contacts end parts 25J and 125J of rear wall surface 25G evenly. Here, moments having the same magnitudes are applied from urging spring 6 to end parts 25J and 125J of rear wall surface 25G about rotation axis 125C in opposite directions. Cam body 25 rotates about rotation axis 125C in rotation direction 1001D by urging force received by end part 25J from urging spring 6. If a direction of longitudinal axis 125L exceeds direction 1001A (1001B) due to momentum of rotation, end part 125J which is opposite to end part 25J receives rotating urging force in leftward rotation direction 1001C which is opposite to rightward rotation direction 1001D from urging spring 6.

This rotating urging force suppresses and stops rotation of cam body 25, and prevents front cam part 25D from hitting release projecting part 7A. Therefore, a hitting noise thereof is not generated.

Front cam part 25D which is rotated and urged may hit release projecting part 7A when the urging force of urging spring 6 is slightly strong due to variation in urging force or due to degradation of resistance of the grease applied to cam body 25. Even in this case, urging spring 6 elastically contacts entire rear wall surface 25G, i.e., end parts 25J and 125J evenly, and suppresses rotating urging force on cam body 25. This allows front cam part 25D to hit release projecting part 7A at a low speed, and therefore, the hitting noise becomes extremely small.

Figure 6A:
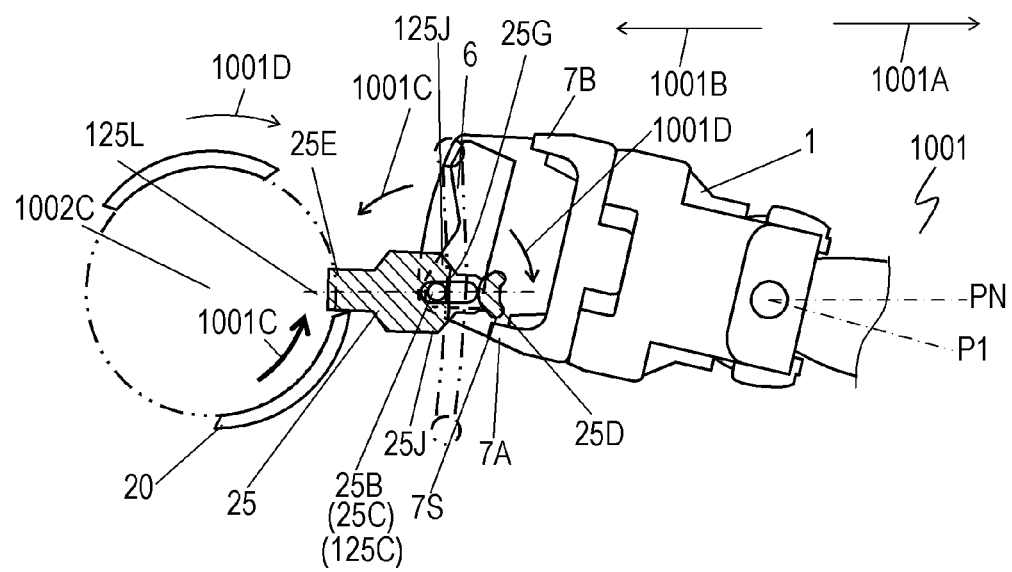
FIGS. 6A to 6C are top schematic views of the turning direction indicator device according to the embodiment for illustrating an operation of the turning direction indicator device.
Figure 6B:
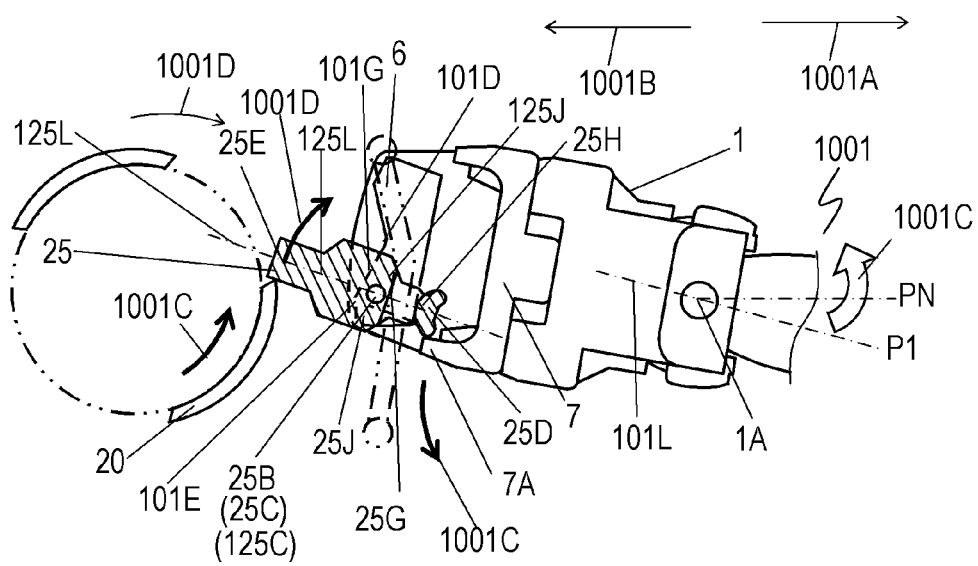
Figure 6C:
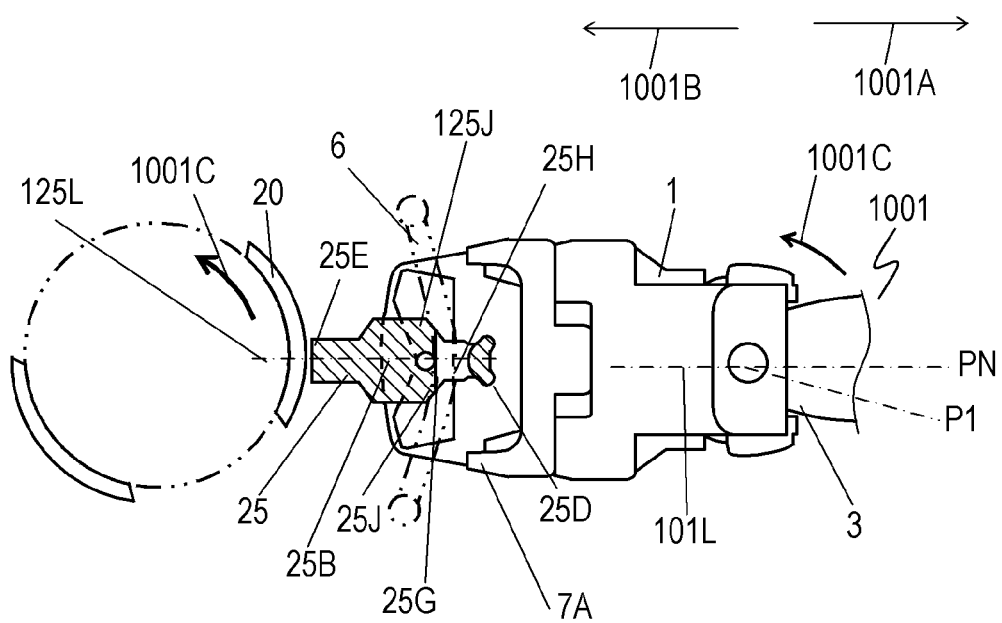

FIGS. 6A to 6C are top schematic views of turning direction indicator device 1001 for illustrating an operation of turning direction indicator device 1001. When the driver has finished turning automobile 2001 and is to return steering wheel 2006 to an original neutral position (see FIG. 4C), steering wheel 2006 rotates steering shaft 1002 in leftward rotation direction 1001C which is opposite to rightward rotation direction 1001D. As shown in FIG. 6A, this rotation allows cancel cam 20 to push rear cam part 25E in rightward rotation direction 1001D to rotate cam body 25 about upper shaft part 25B in rightward rotation direction 1001D. As shown in FIG. 6B, the rotation of cam body 25 allows front cam part 25D to push release projecting part 7A of release element 7 in leftward rotation direction 1001C, thereby causing release element 7 and actuator 1 to rotate about shaft part 1A in leftward rotation direction 1001C. Here, lower shaft part 25C of cam body 25 slides from end part 101E along angled edge 101G to apex 101D of retainer cam 1E. Thus, cam body 25 shifts in frontward direction 1001A to the non-abutting position where rear cam part 25E cannot abut on cancel cam 20.

As front cam part 25D rotates actuator 1 in leftward rotation direction 1001C, as shown in FIG. 6C, actuator 1 together with operating lever 3 returns from first operational position P1 to neutral position PN, and is retained by retainer unit 9 (see FIGS. 1 and 2). In response, switch contact part 12A performs electrical connection and disconnection, whereby electronic circuit 2003 turns off turn-signal lamp 2004B having been flashing on and off.

As described above, when actuator 1 is at neutral position PN, cam body 25 operates to shift to the non-abutting position where rear cam part 25E cannot abut on cancel cam 20. Further, when actuator 1 is at first operational position P1, cam body 25 operates to shift to the abuttable position where rear cam part 25E can abut on cancel cam 20. At this time, the rotation of the cancel cam 20 causes cam body 25 to rotate actuator 1 via release element 7 such that actuator 1 returns to neutral position PN.

As shown in FIG. 6A, predetermined small gap 7S is provided between front cam part 25D of cam body 25 and release projecting part 7A. The rotation angle of cam body 25 and the sizes of cancel cam 20 and release projecting part 7A are determined appropriately while taking gap 7S into consideration, so as to reliably return operating lever 3 to neutral position PN with a predetermined rotation angle of the steering wheel.

When the driver turns automobile 2001 leftward, the driver rotates operating lever 3 to second operational position P2 (see FIG. 5B) in leftward rotation direction 1001C. Thus, actuator 1 is retained by retainer unit 9 at second operational position P2 where actuator 1 has rotated in leftward rotation direction 1001C by a predetermined angle. Here, actuator 1 and cam body 25 rotate in the opposite directions to above described directions. As cancel cam 20 rotates in leftward rotation direction 1001C in accordance with a rotation of steering shaft 1002, front cam part 25D of cam body 25 approaches release projecting part 7B of release element 7 due to urging force of urging spring 6. At this time, urging spring 6 elastically contacts rear wall surface 25G of engaging recess 25F. Accordingly, longitudinal axis 125L of cam body 25 is retained in parallel to direction 1001A (1001B) and does not hit release projecting part 7B, and a hitting noise thereof is not generated, allowing direction indicator 1001 to operate quietly.

It is to be noted that, as the driver rotates operating lever 3 upward and downward, electrical connection and disconnection of the corresponding switch contact part in actuator 1 is carried out, and electronic circuit 2003 switches between high beam and low beam of the headlights.

In turning direction indicator device 1001 of the embodiment, cam body 25 is provided with rear wall surface 25G having its normal in direction 125M of longitudinal axis 125L of cam body 25. If urging spring 6 elastically contacts rear wall surface 25G in direction 1001B in a state where longitudinal axis 125L is parallel to direction 1001B, cam body 25 is retained with its predetermined attitude such that longitudinal axis 125L is parallel to direction 1001B (1001A) in a state where actuator 1 is retained at first operational position P1 and second operational position P2. According to this, predetermined gap 7S can be provided between front cam part 25D and release projecting part 7A (7B) of release element 7. When cam body 25 rotated by cancel cam 20 is rotated and urged by urging spring 6 and longitudinal axis 125L returns to its attitude parallel to direction 1001A (1001B), the urging spring 6 becomes substantially linearly perpendicular to directions 1001A and 1001B, urging spring 6 elastically contacts rear wall surface 25G of cam body 25, and stops the rotation of cam body 25. Here, urging spring 6 retains cam body 25 at the predetermined attitude, front cam part 25D does not hit release projecting part 7A and a hitting noise thereof is not generated. Therefore, it is possible to realize turning direction indicator device 1001 which has a quiet operation noise and which can operate reliably.

As described above, turning direction indicator device 1001 is used with cancel cam 20 rotating in accordance with a rotation of steering shaft 1002. Actuator 1 rotates by an operation of operating lever 3 so as to be positioned at neutral position PN and first operational position P1. Switch contact part 12A performs electrical connection and disconnection and outputs a turning direction indicating signal in accordance with a rotation of actuator 1. Cam body 25 is rotatable about rotation axis 125C, and shifts in rearward direction 1001B approaching cancel cam 20 when actuator 1 rotates from neutral position PN to first operational position P1. Urging spring 6 urges cam body 25. Release element 7 includes coupling part 7C release projecting parts 7A and 7B projecting from coupling part 3C in rearward direction 1001B. Release element 7 rotates together with actuator 1. Cam body 25 includes base part 25A, rear cam part 25E, front cam part 25D, and rear wall surface 25G. Rear cam part 25 projects from base part 25A in a direction approaching cancel cam 20 along longitudinal axis 125L. Front cam part 25D projects from base part 25A in a direction opposite to the direction in which rear cam part projects from base part 25A along longitudinal axis 125L. Rear wall surface 25G has end parts 25J and 125J which are symmetrical to each other with respect to longitudinal axis 125L, and opens in a direction away from cancel cam 20. Front cam part 25D of cam body 25 is located between release projecting parts 7A and 7B of release element 7. Urging spring 6 is operable to elastically contact end parts 25J and 125J of rear wall surface 25G of cam body 25 to urge cam body 25 in rearward direction 1001B. Urging spring 6 is operable to urge cam body 25 in rotating directions 1001C and 1001D about rotation axis 125C when longitudinal axis 125L of cam body 25 rotates about rotation axis 125C.

When actuator 1 is located at first operational position P1, front cam part 25D of cam body 25 is located away from release projecting parts 7A and 7B.

Engaging recess 25F is formed in cam body 25. Engaging recess 25F has rear wall surface 25G and front wall surface 25H facing rear wall surface 25G. Urging spring 6 is engaged with engaging recess 25F. When cam body 25 rotates about rotation axis 125C to the maximum rotation position, front wall surface 25H does not substantially receive urging force from urging spring 6.

Actuator 1 may rotate such that actuator 1 is positioned at neutral position PN, first operational position P1 and second operational position P2 by an operation of operating lever 3. In this case, cam body 25 shifts in rearward direction 1001B when actuator 1 shifts from neutral position PN to second operational position P2.

Cam body 25 shown in FIGS. 4A and 4B has flat rear wall surface 25G having substantially arcuate end parts 25J and 125J, but cam body 25 may have another shape as long as cam body 25 has end parts 25J and 125J.

Figure 7:
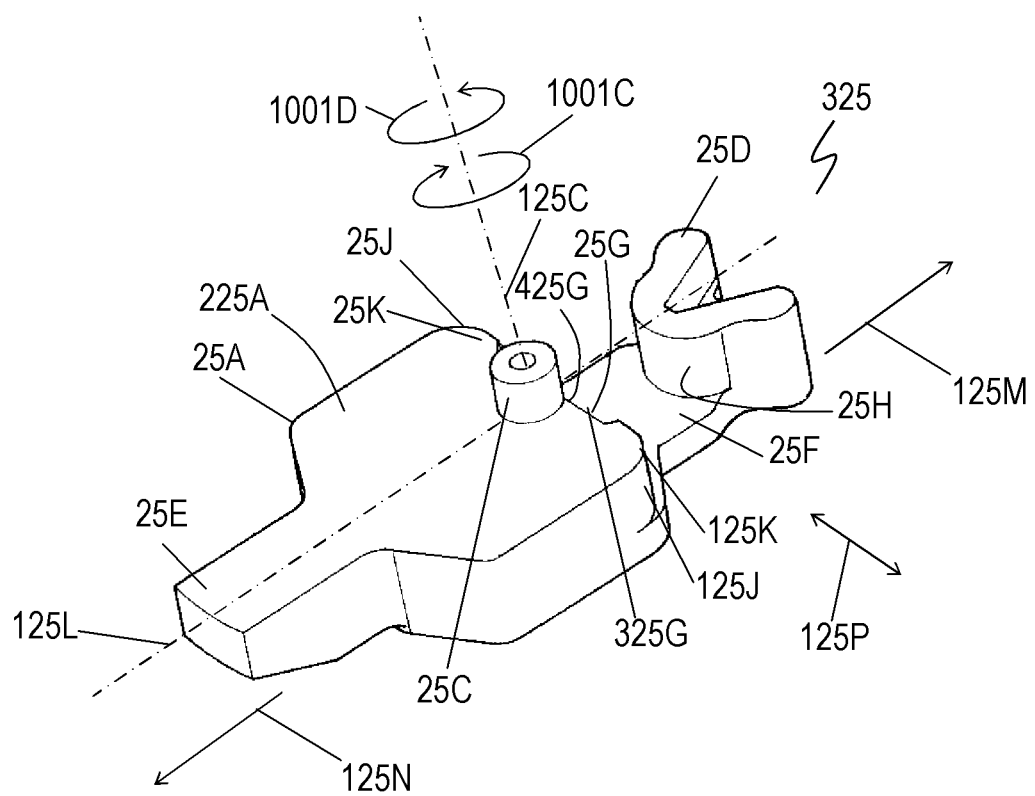
FIG. 7 is a bottom perspective view of another cam body of the turning direction indicator device according to the embodiment.
Figure 8:
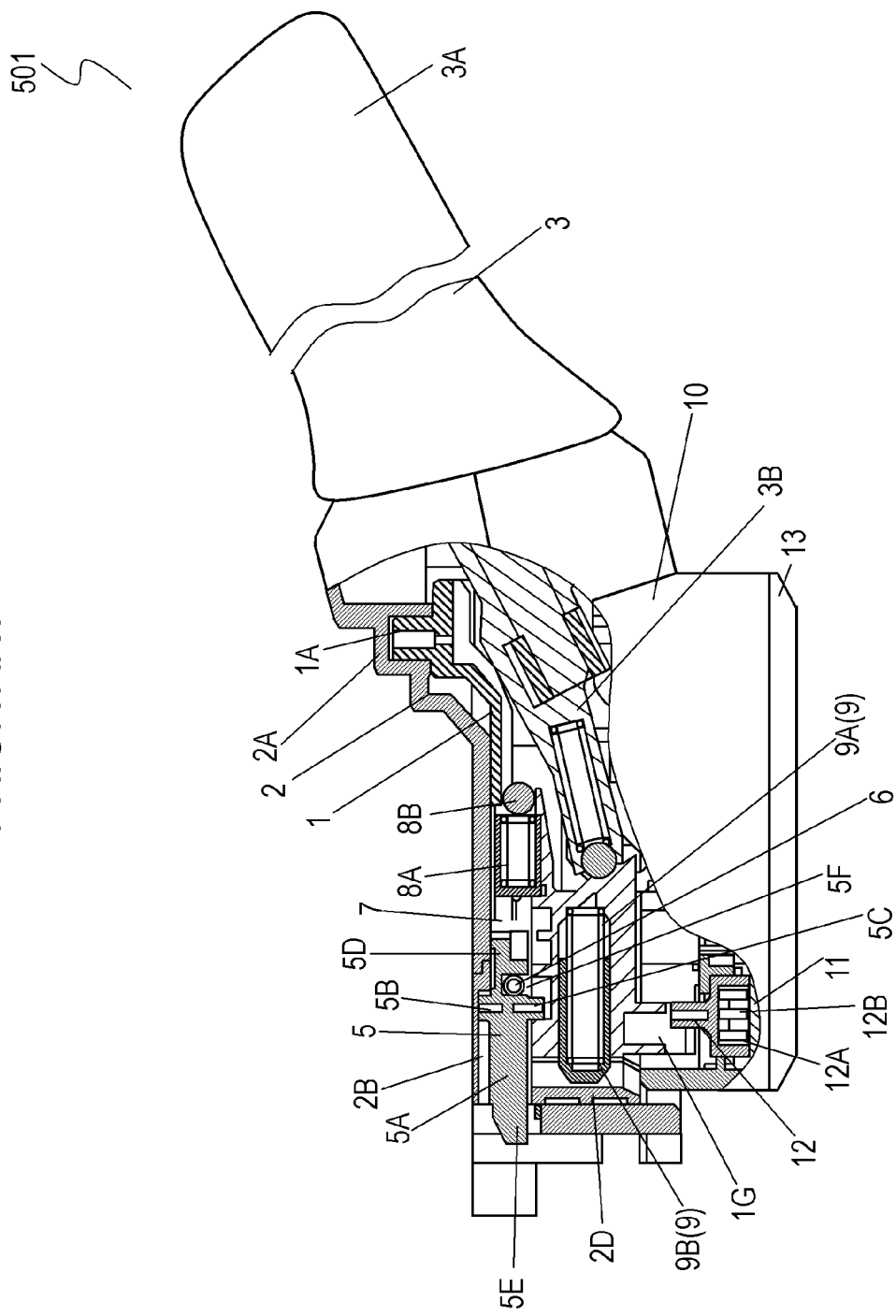
FIG. 8 is a partial cutaway view of a conventional turning direction indicator device.
Figure 9:
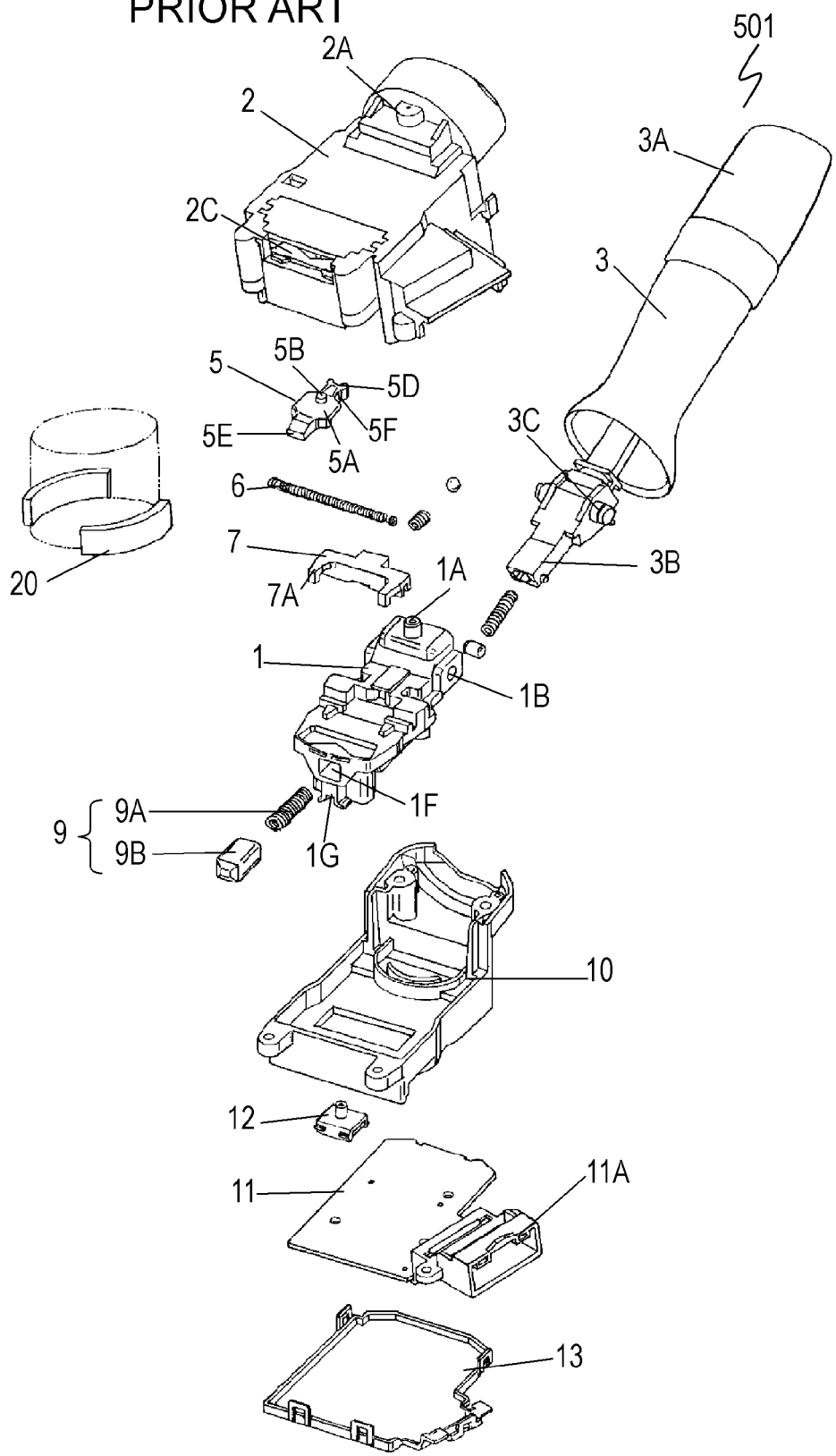
FIG. 9 is an exploded perspective view of the conventional turning direction indicator device.

FIG. 7 is a bottom perspective view of another cam body 325 of turning direction indicator device 1001 according to the embodiment. In FIG. 7, components that are the same as those of cam body 25 shown in FIG. 4B are denoted by the same reference numbers. In cam body 325, recess 325G located between end parts 25J and 125J is formed in rear wall surface 25G. Bottom 425G of recess 325G does not abut on urging spring 6 and is located away from urging spring 6. Substantially arcuate projecting parts 25K and 125K are provided on opposite ends of recess 325G arranged in direction 125P. Portions of projecting parts 25K and 125K on opposite side from recess 325G are end parts 25J and 125J. When longitudinal axis 125L of cam body 25 is parallel to direction 1001B (1001A), urging spring 6 is substantially linear in direction 125P which is substantially perpendicular to directions 1001A and 1001B, and abuts on projecting parts 25K and 125K to elastically contacts cam body 25. According to this, the same effect as that of cam body 25 shown in FIGS. 4A and 4B can be obtained. Diameters of substantially arcuate projecting parts 25K and 125K are determined to be sufficiently greater than the pitch of coil urging spring 6 so that projecting parts 25K and 125K do not bite into urging spring 6.

As described above, rear wall surface 25G may have a flat shape. In this case, urging spring 6 elastically contacts rear wall surface 25G of cam body 25, and urges cam body 25 in rearward direction 1001B. Rear wall surface 25G may be provided with recess 325G therein having bottom 425G between end parts 25J and 125J and located away from urging spring 6.

Upper surface 125A of cam body 25 has substantially a flat shape, and grease exists is applied between upper surface 125A of cam body 25 and lower surface 102B of cover 2. A plurality of ridges extending in a direction substantially perpendicular to longitudinal axis 125L may be formed on at least one of upper surface 125A and lower surface 125B of cam body 25. Grease-retaining recesses may be provided between these ridges to retain grease in a predetermined range even if the indicator device is used for a long period under various environments in terms of changes in temperature, humidity and the like. According to this, rotation of cam body 25 which is rotated and urged by urging spring 6 can be moderated by the grease and the plurality of ridges. Therefore, it is possible to further prevent cam body 25 and release element 7 from hitting each other, and turning direction indicator device 1001 having quiet operation can be obtained.

According to the embodiment, terms, such as "upper surface", "lower surface", "frontward direction", "rearward direction", "rightward rotation direction", and "leftward rotation direction", indicating directions indicate relative directions that are dependent only on relative positional relationship of components, such as actuator 1 and cam body 25, of turning direction indicator device 1001, and do not indicate absolute directions, such as a vertical direction.

What is claimed is:

1. A turning direction indicator device used with a cancel cam rotating in accordance with a rotation of a steering shaft, the turning direction indicator device comprising:
    an operating lever;
    an actuator that rotates by an operation of the operating lever so as to be positioned at a neutral position and a first operational position;
    a switch contact part that performs electrical connection and disconnection and outputs a turning direction indicating signal in accordance with a rotation of the actuator;
    a cam body that is rotatable about a rotation axis, and that shifts in a rearward direction approaching the cancel cam when the actuator rotates from the neutral position to the first operational position;
    an urging spring that urges the cam body; and
    a release element that includes a coupling part, a first release projecting part projecting from the coupling part in the rearward direction, and a second release projecting part projecting from the coupling part in the rearward direction, the release element rotating together with the actuator, wherein
    the cam body includes:
        a base part;
        a rear cam part that projects from the base part in a direction approaching the cancel cam along a longitudinal axis;
        a front cam part that projects from the base part in a direction opposite to the direction in which the front cam part projects from the base part along the longitudinal axis; and
        a rear wall surface that has a first end part and a second end part which are symmetrical to each other with respect to the longitudinal axis, and that opens in a direction away from the cancel cam,
    the front cam part of the cam body is located between the first release projecting part and the second release projecting part of the release element,
    the urging spring is configured to:
        elastically contact the first end part and the second end part of the rear wall surface of the cam body to urge the cam body in the rearward direction, and
        urge the cam body in a rotating direction about the rotation axis when the longitudinal axis of the cam body rotates about the rotation axis, and
    the rear wall surface is provided with a recess between the first end part and the second end part, and the recess has a bottom located away from the urging spring.

2. The turning direction indicator device according to claim 1, wherein the urging spring is configured to elastically contact the rear wall surface of the cam body to urge the cam body in the rearward direction.

3. The turning direction indicator device according to claim 1, wherein a width of the rear wall surface from the first end part toward the second end part is greater than a width of the rear cam part in the direction from the first end part toward the second end part of the rear wall surface, and is smaller than a width of the base part in the direction from the first end part toward the second end part of the rear wall surface.

4. The turning direction indicator device according to claim 1, wherein, when the actuator is at the first operational position, the front cam part of the cam body is located away from the first release projecting part and the second release projecting part.

5. The turning direction indicator device according to claim 1, wherein
    the cam body is provided with an engaging recess therein having the rear wall surface and a front wall surface facing the rear wall surface, the urging spring engaging with the engaging recess, and
    when the cam body rotates about the rotation axis to a maximum rotation position, the front wall surface does not substantially receive urging force from the urging spring.

6. The turning direction indicator device according to claim 1, wherein
    the actuator rotates by the operation of the operating lever so as to be positioned at the neutral position, the first operational position, and a second operational position, and
    the cam body shifts in the rearward direction when the actuator rotates from the neutral position to the second operational position.

7. The turning direction indicator device according to claim 1, wherein the front wall surface of the cam body has an arcuate shape.

8. The turning direction indicator device according to claim 1, wherein, when the cam body rotates about the rotation axis to a maximum rotation position, the urging spring elastically contacts one of the first end part and the second end part of the rear wall surface of the cam body to urge the cam body in an opposite rotation direction to a rotation direction for the maximum rotation position.

* * * * *